United States Patent
Huang et al.

(10) Patent No.: US 11,070,088 B2
(45) Date of Patent: Jul. 20, 2021

(54) WIRELESS POWER TRANSFER

(71) Applicant: Apple Inc., Cupertino, CA (US)

(72) Inventors: Rex Pius Huang, Auckland (NZ);
Michael Scott Eckert, Auckland (NZ);
Mikhal De Jesus, Auckland (NZ);
Arunim Kumar, Cupertino, CA (US);
Atul Salvekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 16/213,915

(22) Filed: Dec. 7, 2018

(65) Prior Publication Data

US 2020/0083747 A1     Mar. 12, 2020

Related U.S. Application Data

(60) Provisional application No. 62/728,685, filed on Sep. 7, 2018.

(51) Int. Cl.
*H02J 50/12*     (2016.01)
*H02J 50/80*     (2016.01)
*H02J 5/00*      (2016.01)
*H02J 7/02*      (2016.01)

(52) U.S. Cl.
CPC .............. *H02J 50/12* (2016.02); *H02J 5/005* (2013.01); *H02J 7/025* (2013.01); *H02J 50/80* (2016.02)

(58) Field of Classification Search
CPC .. H02J 50/12; H02J 50/80; H02J 5/005; H02J 7/025
USPC ........................................................... 307/104
See application file for complete search history.

(56) References Cited

U.S. PATENT DOCUMENTS

| | | | |
|---|---|---|---|
| 8,836,171 B2 * | 9/2014 | Choi ....................... | H02J 7/025 307/104 |
| 9,685,791 B2 | 6/2017 | Yoon | |
| 2005/0201339 A1 * | 9/2005 | Mangin ..................... | H04L 1/16 370/337 |
| 2015/0061404 A1 * | 3/2015 | Lamenza ................... | H03H 7/40 307/104 |
| 2016/0099578 A1 | 4/2016 | Hwang | |
| 2017/0040813 A1 * | 2/2017 | Hu ........................... | H02J 7/02 |
| 2018/0103392 A1 | 4/2018 | Emmanuel et al. | |
| 2018/0212468 A1 * | 7/2018 | Liu ........................... | H02J 50/12 |

FOREIGN PATENT DOCUMENTS

JP     2010178473 A     8/2010

* cited by examiner

*Primary Examiner* — Michael R. Fin
(74) *Attorney, Agent, or Firm* — Blank Rome LLP

(57) ABSTRACT

An inductive power transmitter and an inductive power receiver include communication circuitry to communicate using modulation of the power transfer field. The inductive power transmitter or the inductive power receiver includes monitoring circuitry to determine a communication fault condition. If a communication fault condition is determined, a converter of the inductive power transmitter or inductive power receiver can adjust a control parameter.

38 Claims, 7 Drawing Sheets

WIRELESS POWER TRANSFER

FIELD

This relates generally to wireless power transfer systems.

BACKGROUND

In a wireless charging system, a wireless power transmitting device such as a device with a charging surface or zone wirelessly transmits power to a portable electronic device. The portable electronic device receives the wirelessly transmitted power and uses this power to charge an internal battery or to power the device.

SUMMARY

In some situations, achieving reliable in-band communications between inductive power transmitters and receivers can be difficult. Transient events during communications can cause data transmissions to not be modulated, transmitted or demodulated correctly. Communication failures can also occur when the operating state of the power transmission system is unsuitable for communications. While the power transmission is in an unsuitable operating state, communications may continue to fail.

Failed communications may interfere with or prevent dynamic control of the power transfer system, which may employ feedback or other communications to adapt power transfer parameters based on information reported from one device to another. When a communication failure persists, the communication interface between the transmitter and receiver may be reset. An attempt may then be made to re-establish communications. This may be time consuming and increase the amount of time taken to charge a receiver device. It also may be ineffective if the power transmission remains in the unsuitable operating state after the communications interface is reset.

DETAILED DESCRIPTION

Figure 1:
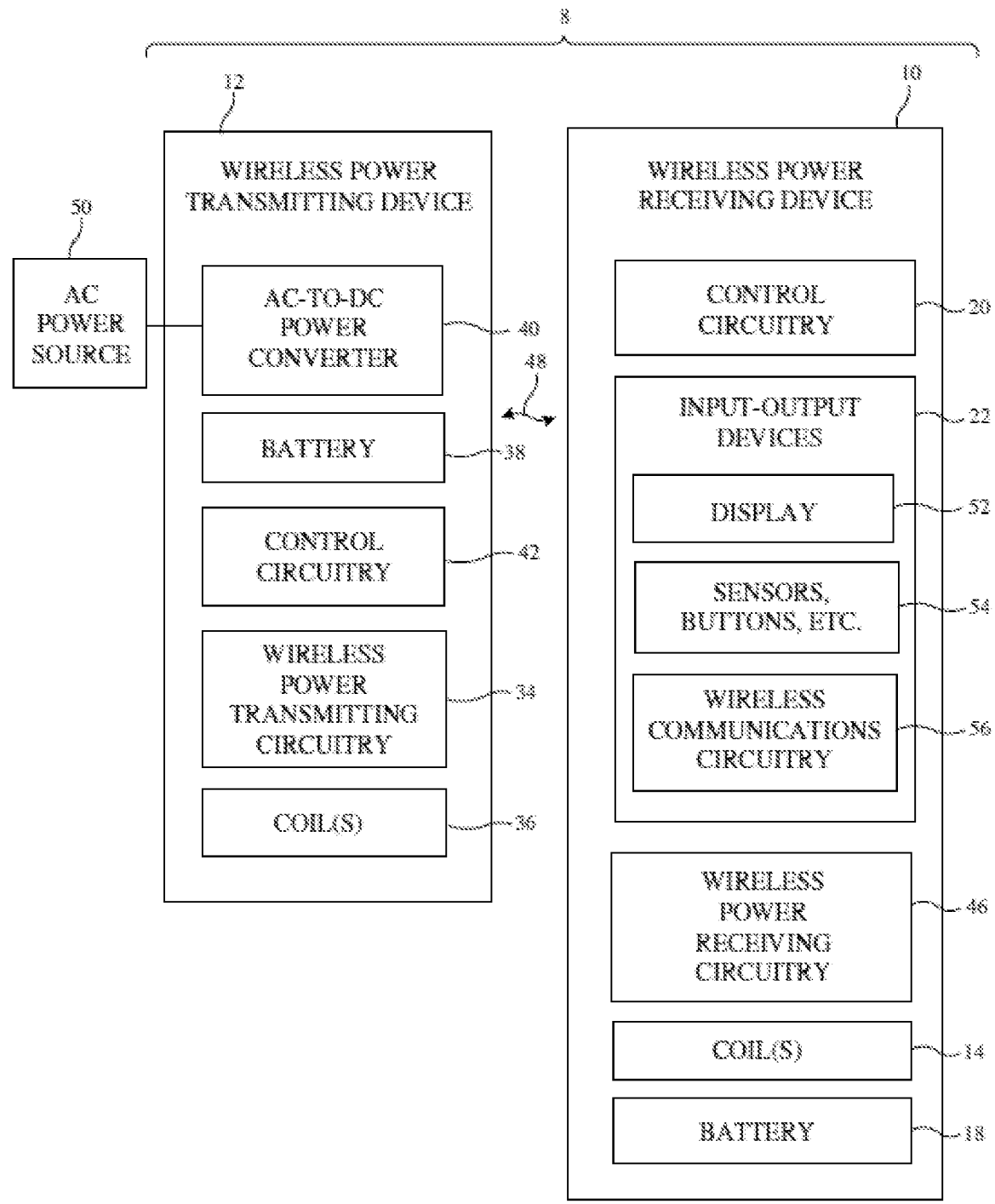
FIG. 1 is a schematic diagram of an illustrative wireless charging system in accordance with some embodiments.

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Wireless power transmitting and receiving devices can be designed to cooperate specifically with each other. For example, the size, shape, number, dimensions and configuration of coils of one or both of the devices may be selected based on the other device. Magnetic elements may also be included in the transmitting and/or receiving device, and the size, shape, number, dimensions and configuration of the magnetic elements may be selected based on the other device.

In some cases, wireless power transmitting and receiving devices can be designed to be closely coupled to each other. This may be achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

Wireless power transmitting and receiving devices and transmitters can also be designed to communicate with each other using the power transfer field or using a separate communication channel. These communications can be used to authenticate devices, negotiate power transfer parameters, and as a feedback mechanism to request higher or lower power during charging, for example. Communication through the wireless power transfer field may be referred to as "in-band" communication. In in-band communication systems, devices modulate the power transfer field to encode information and demodulate the field to decode information. There are various parameters of the power transfer field that can be modulated to communicate information, such as amplitude, frequency and phase. There are various ways in which each of these parameters could be modulated, including various analog and digital encoding schemes.

An illustrative wireless power system (wireless charging system) is shown in FIG. 1. As shown in FIG. 1, a wireless power system 8 includes a wireless power transmitting device 12 and one or more wireless power receiving devices such as wireless power receiving device 10. Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 may be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time varying electromagnetic field (wireless power signals 48) is produced, that is received by one or more corresponding coils 14 electrically connected to wireless power receiving circuitry 46 in receiving device 10. If the time varying electromagnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g. tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuits 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example device 12 and/or device 10 may communicate using in-band communications injected or combined into the wireless power signals 48 in accordance with any suitable scheme, for example as proposed in the Wireless Power Consortium Qi specification 1.1, which is incorporated herein by reference. In addition to the in-band communications system, a separate Bluetooth®, RFID, NFC, Zigbee, Wifi RF or other communication system may be employed.

Figure 2:
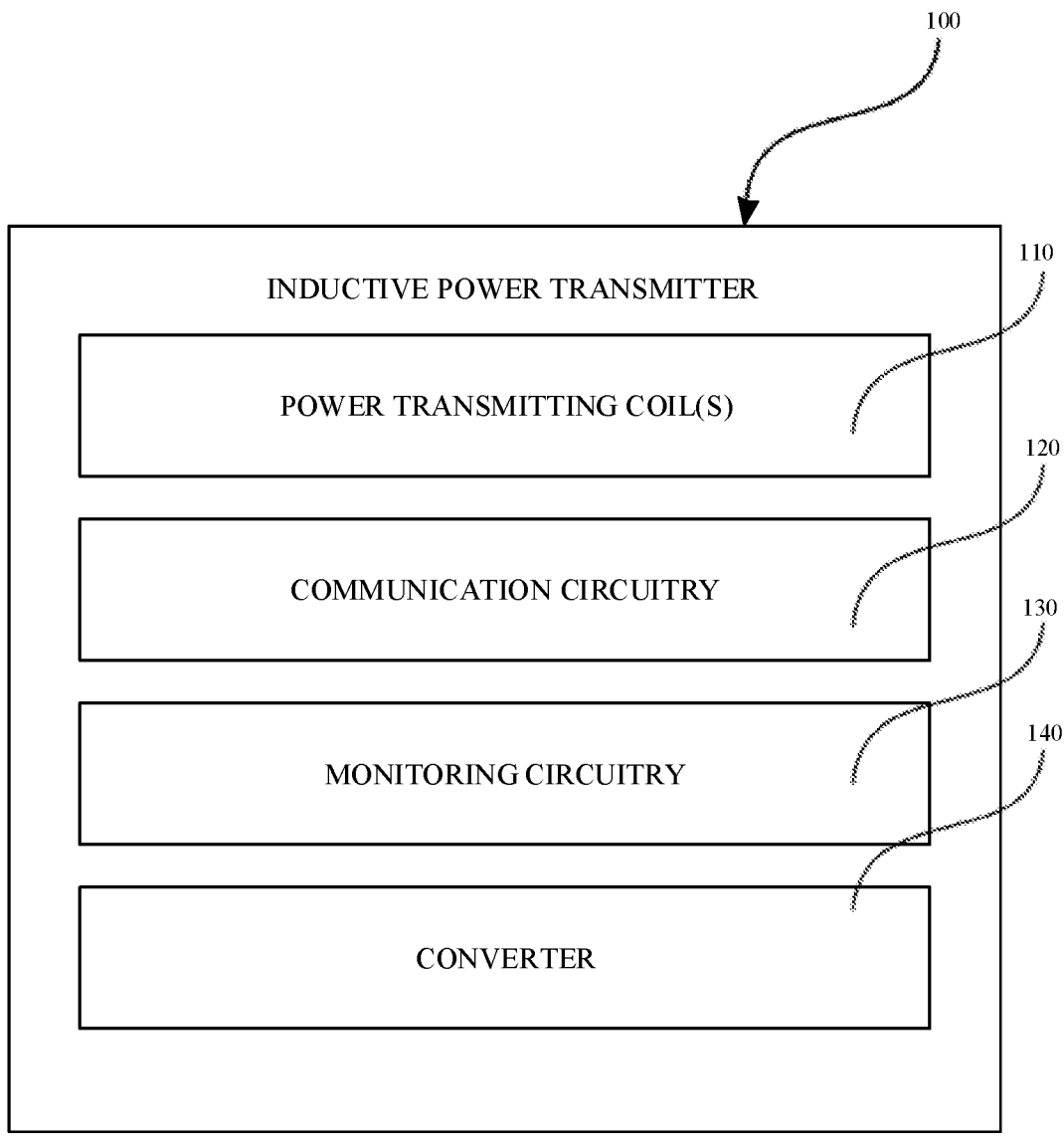
FIG. 2 is a schematic diagram of an illustrative inductive power transmitter in accordance with an embodiment.

An illustrative inductive power transmitter 100 is shown in FIG. 2. The transmitter 100 includes a power transmitting coil 110, communication circuitry 120, monitoring circuitry 130 and a converter 140.

Various types of power transmitting coils may be used in the transmitter 100 to produce the inductive power field. For example, the transmitting coil 110 may be planar or elongate depending on the application. The coil may also be provided with a magnetic core to guide and focus the magnetic field produced by the coil.

The transmitter 100 may have a plurality of power transmitting coils that may be connected in parallel or series or energized independently. For example, the transmitter 100 may be a charging mat with an array of transmitter coils configured to provide inductive power signals to one or more receivers placed on a charging surface of the mat.

In some examples, the transmitter 100 may have two or more coils wound about respective limbs of a magnetic core to form a coil assembly.

It will be appreciated that the coil or coils may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

The power transmitting coil 110 may be electrically connected to or more capacitances to form a resonant circuit. The transmitting coil may be connected to the capacitance(s) in series, parallel or a combination of series and parallel connections. In one example, the power transmitting coil 110 is connected to a tuning capacitor in series to form a series-tuned resonant circuit.

The communication circuitry 120 enables the transmitter 100 to communicate with other devices coupled to the power transfer field such as inductive power receivers. The communication circuitry 120 performs in-band communication using modulation of the inductive power transfer field produced using the power transmitting coil(s) 110. Various types of in-band communication circuitry 120 may be employed in the transmitter 100. For example, the transmitter communication circuitry 120 may use amplitude modulation, frequency modulation, phase modulation, or a combination of these. The communication circuitry 120 may transmit signals of one modulation type and receive and demodulate signals of the same modulation type or a different modulation type. In one example, the transmitter communication circuitry 120 is configured to transmit frequency-shift keying (FSK) signals or amplitude-shift keying (ASK) signals. In one example, the transmitter communication circuitry 120 is configured to receive amplitude-shift keying (ASK) signals. The communication circuit may communicate using packets or a continuous bit stream. In one example, the communication circuit transmits and receives packets. The packets may include at least a header and a payload.

The monitoring circuitry 130 is operatively connected to the communication circuitry 120 and configured to determine a communication fault condition. The monitoring circuitry 130 may be implemented using hardware components, software components or a combination of hardware and software. There are various ways the monitoring circuit may determine a communication fault condition. For example, if a communication is received that is corrupt, unreadable, incomplete or otherwise invalid, this may be taken as an indication of a fault condition. If the transmitter 100 transmits a message, to which it expects a response, the absence of a response within some timeframe (i.e. a "missed" packet) may be taken as an indication of a fault condition. The monitoring circuitry 130 may determine a communication fault condition based on physical parameters of a received signal being outside of a range. For example, in an ASK system if the difference between high and low voltages that correspond to binary bits is less than a predetermined or dynamic value, this may indicate a communication fault condition. In another example, if a signal to noise ratio (SNR) or received signal strength indicator (RSSI) related to the communication channel is below a predetermined to dynamic value, this may indicate a communication fault condition. In a system that uses acknowledgements (or non-acknowledgements) of receipt of messages, these could be used to determine a communication fault condition. For example, if the communication circuitry 120 does not receive an expected acknowledgement, or does receive a non-acknowledgement, this may indicate a communication fault condition. The acknowledgements and non-acknowledgements may be ACK and NACK packets, in one example. In some examples, the monitoring circuitry 130 may determine a communication fault condition based on current system parameters such as transmitter-receiver coupling coefficient, received voltage at the receiver, power drawn by a load of receiver etc. One or more of these parameters may be compared to a look-up table or input to a formula to determine whether the current system operating state is likely to be unsuitable for communications. The look-up table or formula in this case may be produced from empirical data of communication quality for different operating states or from a mathematical model of a power transfer system and its behavior in different operating states. In one example, the monitoring circuit will determine a communication fault based on a missed or corrupt packet.

Various conditions of the operating state may lead to poor communications quality. In some cases, low voltage received at the receiver may correlate with poor communications conditions. This may be measured at the output of a rectifier of the receiver. In some cases, low coupling coefficient between the transmitter and receiver may correlate with poor communications condition. Of course, many other situations may lead to poor communications quality, including combinations of conditions like received voltage, coupling coefficient, and other variables. The adjustment of the control parameter(s) may address the poor communications conditions by altering one or more of these conditions.

The transmitter 100 includes a converter 140 to provide an alternating current (AC) voltage to the transmitting coil 110. This drives the coil to produce the power transfer field. The converter 140 is configured to adjust a control parameter upon determination of a communication fault condition. By adjusting a control parameter, the converter 140 may remove or alleviate the communication fault condition. This may be particularly useful when the communication fault condition is a non-transitory one based on the operating parameters of the power transfer system. Adjusting the control parameter may shift the operating parameters from a state which is unsuitable for communications to a state that is suitable for communications.

The converter 140 may include one or more DC-DC converters, AC-DC converters (rectifiers), AC-AC converters, DC-AC converters (inverters), transformers, regulators or the like. Suitable DC-DC converters include buck converters, boost converters, buck-boost converters and flyback converters. Suitable AC-DC converters include diode bridge rectifiers, synchronous rectifiers and voltage multipliers. Suitable DC-AC converters include push-pull inverters and full-bridge inverters. In one example, the converter includes a DC-DC boost converter. In one example, the converter 140 includes a full-bridge inverter.

There are many converter control parameters that may affect the operating state of the power transfer system. Adjusting any of these may improve the operating state with respect to its suitability for communication.

The control parameters may be power transfer parameters. The power transfer parameters may be any parameters of the power transfer link between the power supply to the transmitter 100 and the receiver load. The control parameter may be, or may affect, level of power provided to the transmitting coil 110. The control parameters may be characteristics of a voltage provided to the transmitting coil 110. For example, the converter 140 may adjust the amplitude, duty cycle, phase delay and/or frequency of the voltage provided to the transmitting coil 110.

The converter 140 may adjust the amplitude of the voltage provided to the transmitting coil 110 by adjusting the output of an AC-AC converter, a DC-DC converter or an AC-DC converter. In one example, the amplitude of AC voltage output by the inverter to the coil depends on the level of the DC voltage provided to the inverter such that increasing the output of the DC-DC converter may increase the amplitude of the AC voltage provided to the coil by the inverter, and vice-versa. In one example, the converter 140 includes a boost converter and the converter 140 is configured to adjust the output voltage of the boost converter.

The converter 140 may adjust the voltage provided to the transmitting coil 110 by adjusting operation of an inverter. In one example, the inverter is a full-bridge inverter with phase shift control such that voltage provided to the transmitting coil 110 depends on the phase shift between switches of the inverter bridge. For example, the inverter may be in the form of a full H-bridge with power being supplied to the transmitting coil 110 via switches in each limb of the H bridge. Switches on the same side of the transmitting coil 110 may be switched complementarily with each other such that when one switch is off, the other is on. The phase between the switches on one side of the transmitting coil 110 and the switches on the other side of the transmitting coil 110 may be controlled to control the voltage provided to the transmitting coil 110. With a 180° phase shift between switches on one side of the coil 110 and switches on the other side of the coil 110, diagonally opposite switches are switched on and off at the same time. When the phase shift is less than 180°, diagonally opposite switches will be in opposite states for some portion of the cycle and either of the "upper" pair or "lower" pair of switches will be simultaneously on for that portion of the cycle, meaning the two side of the coil 110 are at approximately the same potential for this portion. In this example, maximum duty cycle may be obtained at 180° phase shift. The duty cycle may be increased as the phase shift is adjusted towards 180° and vice versa.

The converter 140 may adjust the frequency of the voltage provided to the transmitting coil 110 by adjusting the frequency of voltage output by the inverter. In one example, the inverter is a full-bridge inverter and the frequency output by the inverter may be adjusted by adjusting the frequency of switching of switches of the inverter.

It will be appreciated that the transmitter 100 may include control circuitry such as analogue circuitry, one or more microprocessors, baseband processors, digital signal processors, field-programmable gate arrays, microcontrollers, and/or application-specific integrated circuits with processing circuits. The control circuitry may be used in performing communication, monitoring and determination of a fault condition and control of the converter 140 such that it forms at least part of one or more of the communication circuitry 120, monitoring circuitry 130 and converter 140.

Figure 3:
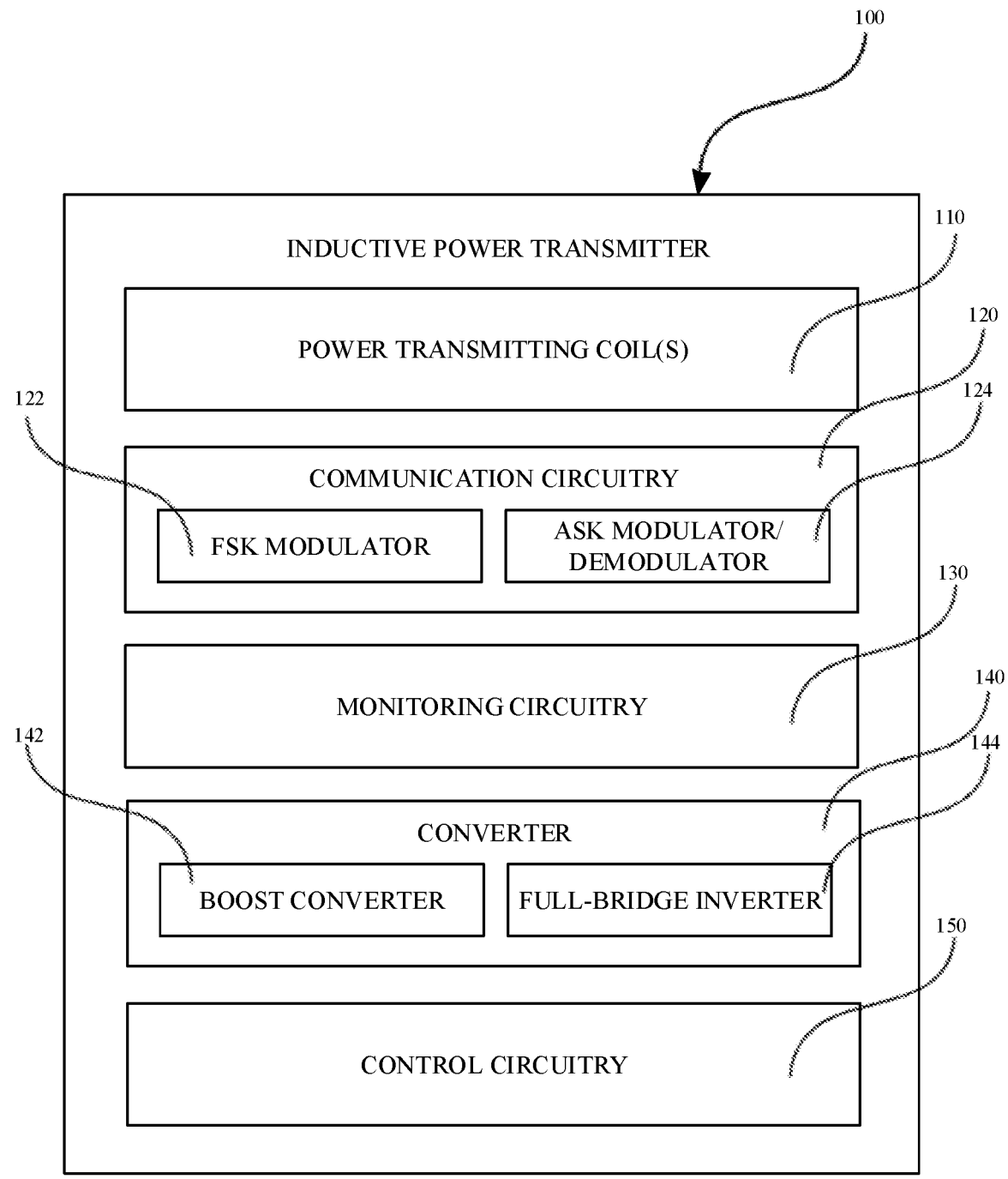
FIG. 3 is a schematic diagram of an illustrative inductive power transmitter in accordance with another embodiment.

An illustrative inductive power transmitter 100 is shown in FIG. 3 in accordance with one embodiment. In this example, the transmitter 100 is provided with one or more power transmitting coil(s) 110, communication circuitry 120, monitoring circuitry 130, a converter 140, and control circuitry 150. The communication circuitry in the example includes an FSK modulator 122. The communication circuitry in this example includes an ASK modulator and/or an ASK demodulator 124. The converter in this example includes a boost converter 142 and a full-bridge inverter 144.

Figure 4:
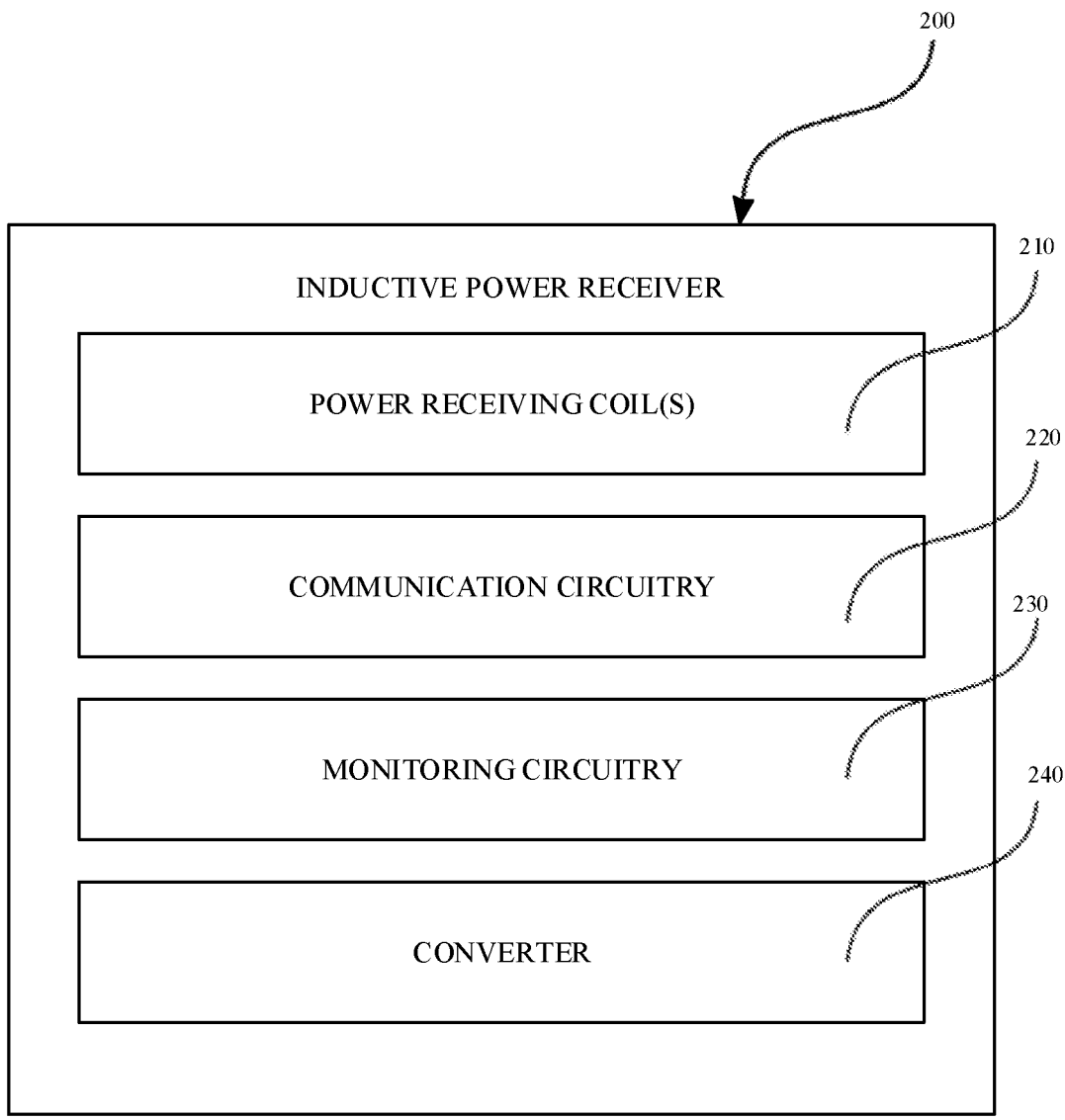
FIG. 4 is a schematic diagram of an illustrative inductive power receiver in accordance with an embodiment.

An illustrative inductive power receiver 200 is shown in FIG. 4. The receiver 200 includes a power receiving coil 210, communication circuitry 220, monitoring circuitry 230 and a converter 240.

Various types of power receiving coils may be used in the receiver 200 to couple to the inductive power field. For example, the receiver coil may be planar or elongate depending on the application. The coil may also be provided with a magnetic core to guide and focus the magnetic field to which the coil may couple.

The receiver 200 may have a plurality of power receiving coils that may be connected in parallel or series or energized independently. In some examples, the receiver 200 may have two or more coils wound about respective limbs of a magnetic core to form a coil assembly.

It will be appreciated that the coil or coils may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

The power receiving coil 210 may be electrically connected to or more capacitances to form a resonant circuit. The receiving coil may be connected to the capacitance(s) in series, parallel or a combination of series and parallel connections. In one example, the power receiving coil 210 is connected to a tuning capacitor in series to form a series-tuned resonant circuit.

The communication circuitry 220 enables the receiver 200 to communicate with other devices coupled to the power transfer field such as inductive power transmitters. The communication circuitry 220 communicates using modulation of the inductive power transfer field coupled to by the power receiving coil(s) 210. Various types of in-band communication circuitry 220 may be employed in the receiver 200. For example, the receiver communication circuitry 220 may use amplitude modulation, frequency modulation, phase modulation, or a combination of these. The communication circuitry 220 may transmit signals of one modulation type and receive and demodulate signals of the same modulation type or a different modulation type. In one example, the receiver communication circuitry 220 is configured to transmit amplitude-shift keying (ASK) signals. In one example, the receiver communication circuitry 220 is configured to receive amplitude-shift keying (ASK) signals or frequency-shift keying (FSK) signals. The communication circuit may communicate using packets or a continuous bit stream. In one example, the communication circuit transmits and receives packets. The packets may include at least a header and a payload.

The monitoring circuitry 230 is operatively connected to the communication circuitry 220 and configured to determine a communication fault condition. The monitoring circuitry 230 may be implemented using hardware components, software components or a combination of hardware and software. There are various ways the monitoring circuit may determine a communication fault condition. For example, if a communication is received that is corrupt, unreadable, incomplete or otherwise invalid, this may be taken as an indication of a fault condition. If the receiver 200 transmits a message, to which it expects a response, the absence of a response within some timeframe (i.e. a "missed" packet) may be taken as an indication of a fault condition. The monitoring circuitry 230 may determine a communication fault condition based on physical parameters of a received signal being outside of a range. For example, in an ASK system if the difference between high and low voltages that correspond to binary bits is less than a predetermined or dynamic value, this may indicate a communication fault condition. In another example, if a signal to noise ratio (SNR) or received signal strength indicator (RSSI) related to the communication channel is below a predetermined or dynamic value, this may indicate a communication fault condition. In a system that uses acknowledgements (or non-acknowledgements) of receipt of messages, these could be used to determine a communication fault condition. For example, if the communication circuitry 220 does not receive an expected acknowledgement, or does receive a non-acknowledgement, this may indicate a communication fault condition. The acknowledgements and non-acknowledgements may be ACK and NACK packets, in one example. In some examples, the monitoring circuitry 230 may determine a communication fault condition based on current system parameters such as transmitter-receiver coupling coefficient, received voltage at the receiver 200, power drawn by a load of the receiver 200 etc. One or more of these parameters could be compared to a look-up table or input to a formula to determine whether the current system operating state is likely to be unsuitable for communications. The look-up table or formula in this case may be produced from empirical data of communication quality for different operating states or from a mathematical model of a power transfer system and its behavior in different operating states. In one example, the monitoring circuit will determine a communication fault based on a missed or corrupt packet.

The receiver 200 includes a converter 240 to convert an alternating current (AC) voltage received using the receiving coil 210 into a form suitable to be provided to a load. The converter 240 is configured to adjust a control parameter upon determination of a communication fault condition. By adjusting a control parameter, the converter 240 may remove or alleviate the communication fault condition. This may be particularly useful when the communication fault condition is a non-transitory one based on the operating parameters of the power transfer system. Adjusting the control parameter may shift the operating parameters from a state which is unsuitable for communications to a state that is suitable for communications.

The converter 240 may include one or more DC-DC converters, AC-DC converters (rectifiers), AC-AC converters, DC-AC converters (inverters), transformers, regulators or the like. Suitable DC-DC converters include buck converters, boost converters, buck-boost converters and flyback converters. Suitable AC-DC converters include diode bridge rectifiers, synchronous rectifiers and voltage multipliers. In one example, the converter 240 includes a DC-DC buck converter. In one example, the converter 240 includes a full-bridge synchronous rectifier.

There are many converter control parameters that may affect the operating state of the power transfer system. Adjusting any of these may improve the operating state with respect to its suitability for communication.

The control parameters may be power transfer parameters. The power transfer parameters may be any parameters of the power transfer link between the power supply to the transmitter 100 and the receiver load. The control parameters may include characteristics of a voltage produced by the converter 240. For example, the converter 240 may be configured to adjust the amplitude of voltage produced by the converter 240. In one example, the converter 240 includes a DC-DC buck converter that is configured to adjust the amplitude of voltage provided to the load. In one example, the converter 240 includes a synchronous rectifier that may be configured to control the rectified voltage at the output of the rectifier.

It will be appreciated that the receiver 200 may include control circuitry such as analogue circuitry, one or more microprocessors, baseband processors, digital signal processors, field-programmable gate arrays, microcontrollers, and/or application-specific integrated circuits with processing circuits. The control circuitry may be used in performing communication, monitoring and determination of a fault condition and control of the converter 240 such that it forms at least part of one or more of the communication circuitry 220, monitoring circuitry 230 and converter 240.

Figure 5:
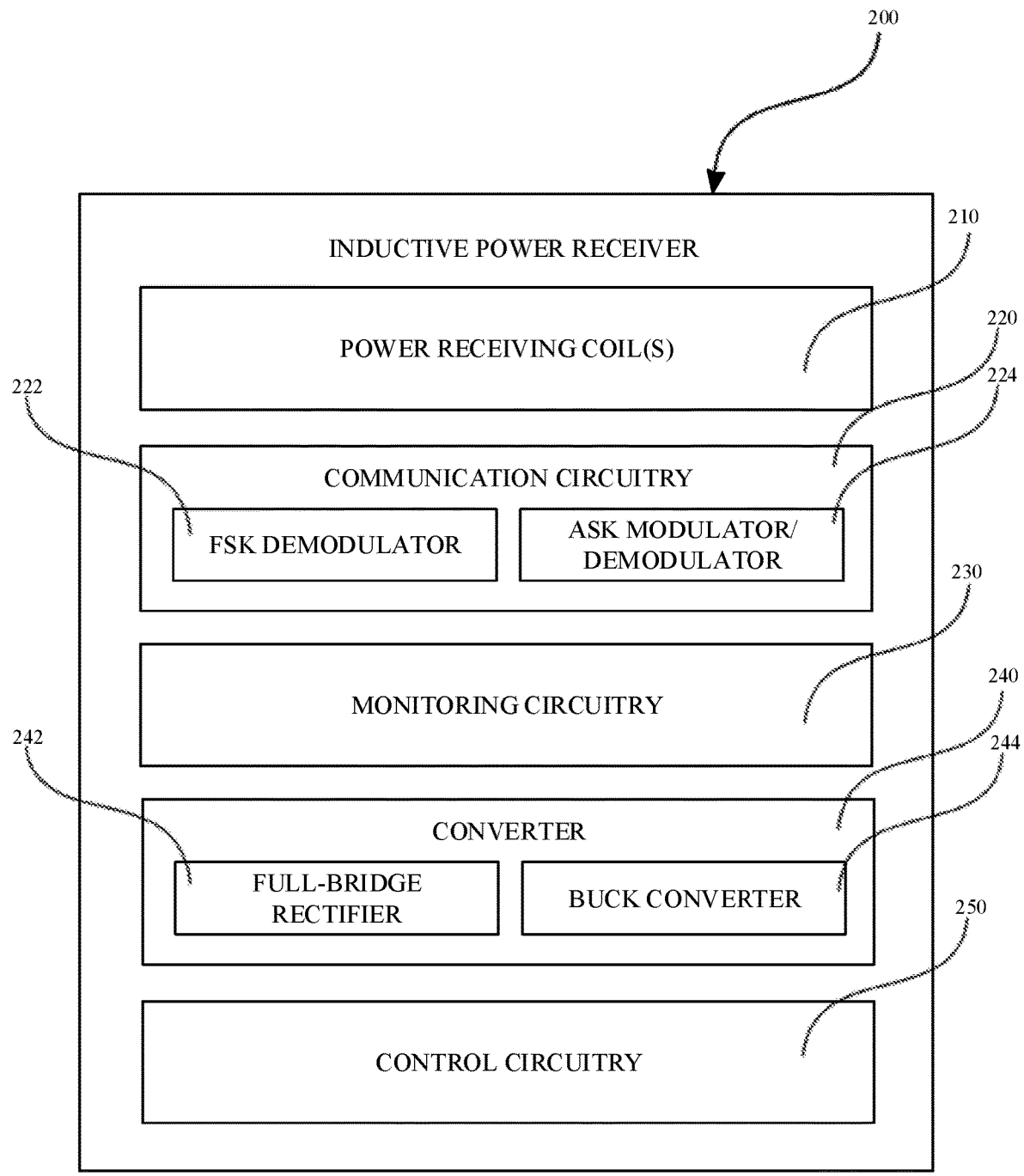
FIG. 5 is a schematic diagram of an illustrative inductive power receiver in accordance with another embodiment.

An illustrative inductive power receiver 200 is shown in FIG. 5 in accordance with one embodiment. In this example, the receiver 200 includes one or more power receiving coil(s) 210, communication circuitry 220, monitoring circuitry 230, a converter 240 and control circuitry 250. In this example, the communication circuitry 220 includes an FSK demodulator 222. In this example, the communication circuitry 220 includes an ASK modulator 224, and may also include an ASK demodulator. In this example, the converter 240 includes a full-bridge synchronous rectifier 242 and a DC-DC buck converter 244.

Figure 6:
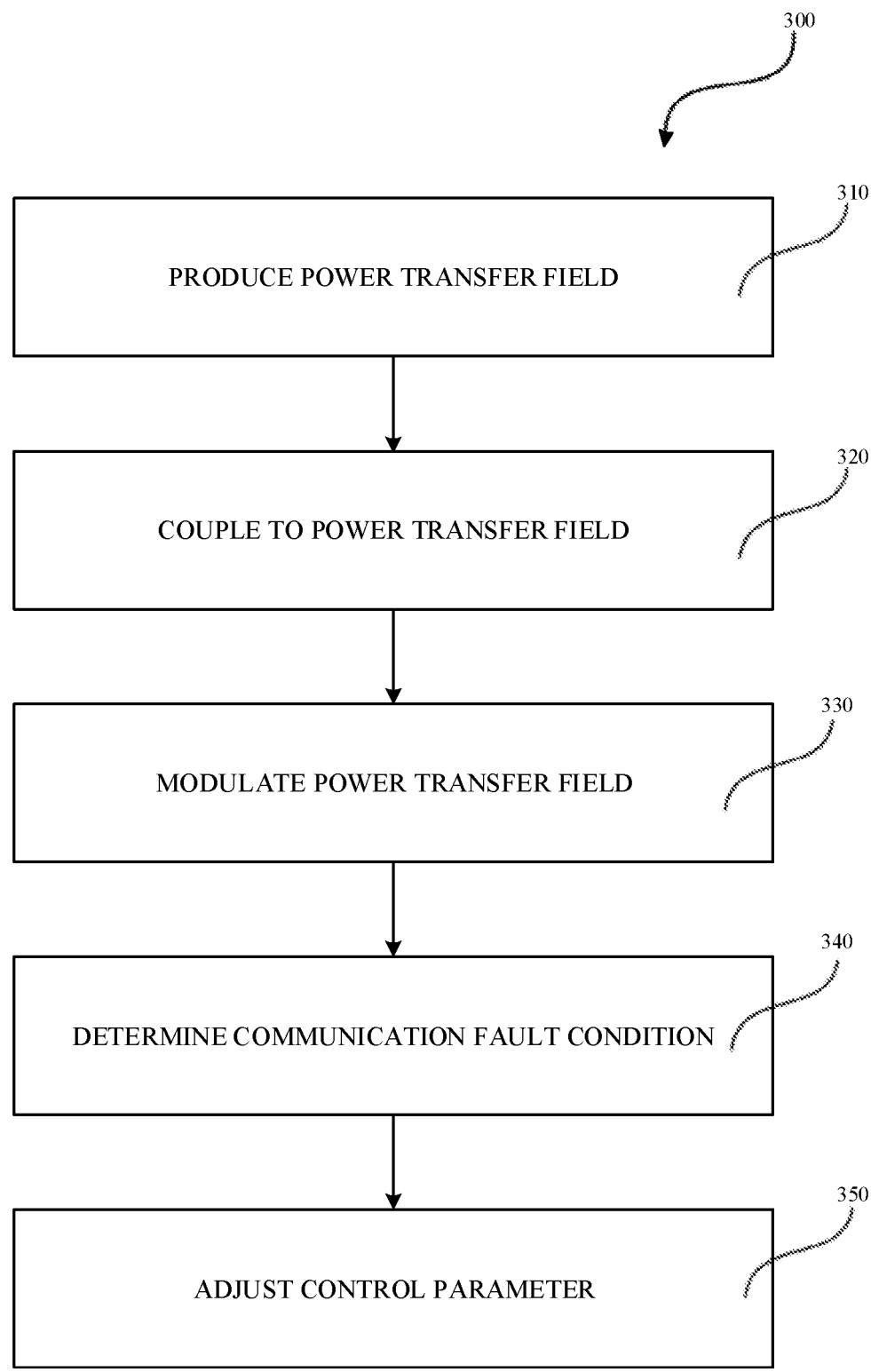
FIG. 6 is a flow chart of an illustrative method in accordance with an embodiment.

An illustrative method is shown in FIG. 6. The method 300 includes, in step 310, producing an inductive power transfer field using an inductive power transmitter 100. In step 320, an inductive power receiver 200 couples to the inductive power transfer field. In step 330, one or both of the transmitter 100 and receiver 200 modulates the inductive power transfer field to attempt to communicate with the other device. In step 340, a determination is made whether a communication fault condition exists with the modulated field. Upon determination of the fault condition, in step 350 a control parameter of the transmitter 100 or receiver 200 is adjusted.

After a control parameter is adjusted, the power transfer field may be modulated again to attempt to communicate under the adjusted conditions. This may be referred to as a "re-try". For example, in a packet-based system, a control parameter may be adjusted before the packet is retransmitted. If a communication fault condition is determined with respect to the re-try, the method 300 may adjust a control parameter again. This may be repeated up to a limited maximum number of times, up to a limited maximum time limit, or indefinitely until a fault condition is no longer determined. This may form a loop between the modulation 330, determination 340 and adjustment 350 steps. The loop may be broken by a non-determination of a fault condition, a maximum number of re-tries being reached, or a maximum time limit being reached. A fault condition may no longer be determined by way of a positive determination of removal or alleviation of the fault condition or by absence of a determination of a fault condition.

The control parameter that is adjusted in a particular adjustment step may be the same control parameter as adjusted in another adjustment step or a different parameter. The direction in which a control parameter is adjusted in a particular adjustment step may be the same as in another adjustment step or a different direction. For example, if a control parameter is increased in one adjustment step, it may be decreased in another step. The amount by which a control parameter is adjusted in a particular adjustment step may be the same as in another adjustment step or a different amount. For example, a control parameter may be adjusted by a greater amount in each successive adjustment step. The control parameters may be adjusted according to a predetermined or dynamic strategy or rule. The control parameters may be adjusted randomly or according to a strategy or rule that incorporates some randomness. For example, a random choice of which control parameter to adjust may be made, but the adjustment may be by a fixed or limited amount.

If a fault condition is no longer determined, the loop between the modulation/re-try step 330, determination 340 and adjustment 350 steps may be exited. After exiting this loop, the one or more adjusted control parameters may remain at the last adjusted state(s) or may return to the pre-adjustment state(s). The power transfer system may self-regulate back to a nominal operating state after exiting the loop.

If a maximum number of re-tries is reached, or if a time limit is reached or exceeded, the communication interface between the transmitter 100 and receiver 200 may be reset. In one example, the maximum number of retries is less than 20, less than 10, or less than 6. In one example, the maximum number of re-tries is 3. In one example the time limit is less than about 2 seconds, less than about 1 second, or less than about 600 ms. In one example, the maximum time is about 300 ms.

In one example, a control parameter may be progressively adjusted at each adjustment step until a fault condition is removed, a time limit is reached, or an adjustment limit of that control parameter is reached. If an adjustment limit of a control parameter is reached, a different control parameter may be adjusted in any subsequent adjustment step(s). For example, if a first parameter is increased in one or more adjustment steps until it reaches its maximum value or a dynamic or predetermined limit, the first parameter may be maintained in its last adjusted state and in a subsequent adjustment step a second parameter may be adjusted.

The method 300 may include, when a communication fault condition is determined, modulating the power transfer field to attempt to communicate one or more times (re-tries) without adjustment of the control parameters. This may be performed for a number of times or for a limited time. If a communication fault condition is determined after the one or more re-tries using the un-adjusted control parameters, the step of adjusting the control parameter(s) may then be performed. The number of re-tries at the unadjusted control parameters may be less than 10, less than 5, or less than 3. In one example, the number of re-tries at the unadjusted control parameters is 1.

As discussed previously, there are various suitable ways in which the transmitter 100 and receiver 200 may communicate via modulation of the power transfer field, various suitable ways in which a determination of a communication fault condition may be made, and various suitable control parameters that may be adjusted. The method 300 is not limited to any particular examples of performing these steps.

Figure 7:
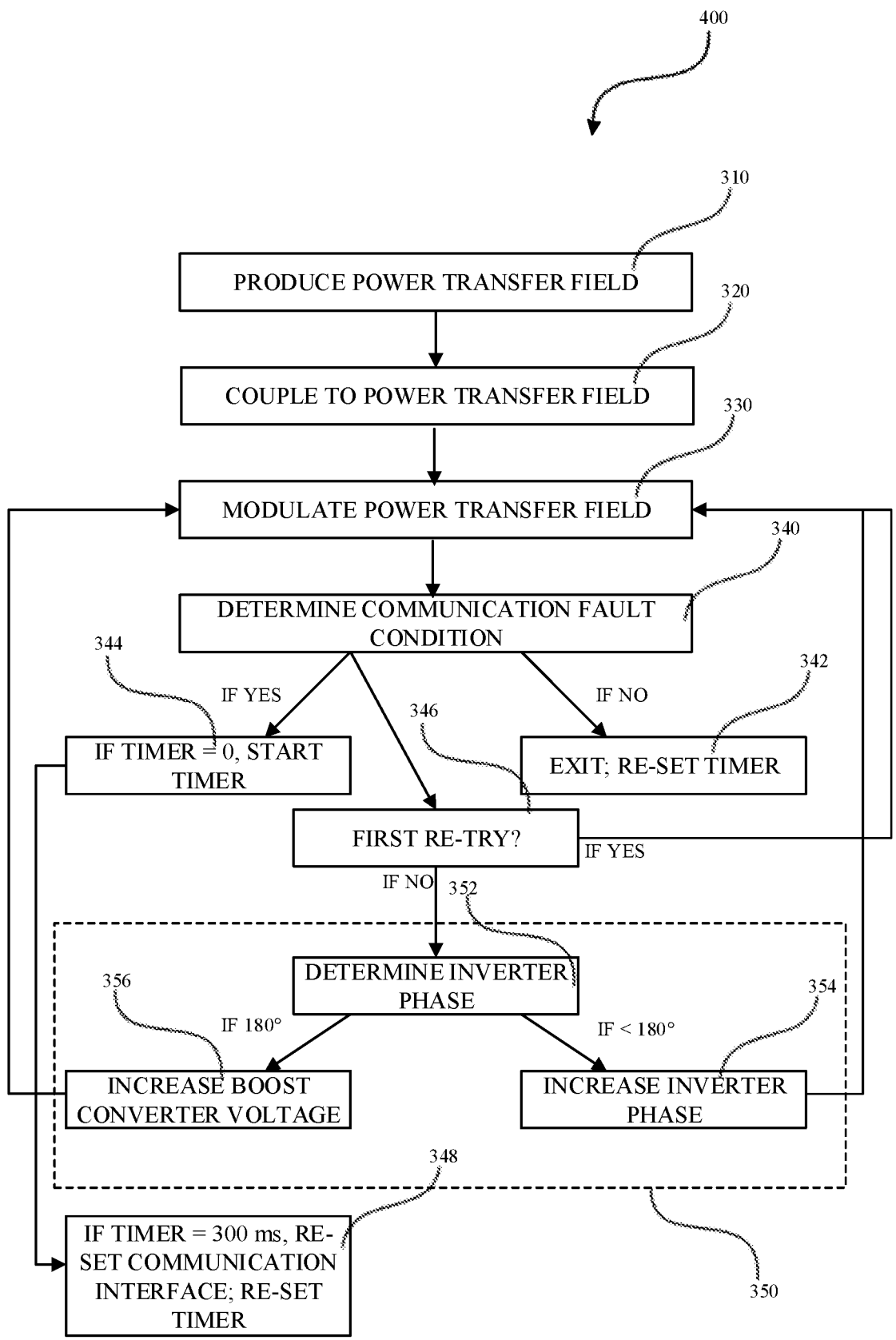
FIG. 7 is a flow chart of an illustrative method in accordance with another embodiment.

An illustrative example of the method 400 is shown in FIG. 7 in accordance with one embodiment. The method begins with an inductive power transfer field being produced in step 310 and coupled to in step 320. In step 330, the power transfer field is modulated to attempt communication between an inductive power transmitter 100 and an inductive power receiver 200. In step 340, a determination is made whether there is a communication fault condition. If no fault is determined, the re-try loop is exited in step 342 without a re-try or control parameter adjustment being made.

If a communication fault condition is determined in step 340, a timer may be started in step 342. The timer is started in step 344 if it is currently at 0, i.e. it has not been started during this re-try loop because the re-try loop has just been entered. In this embodiment, there is a 300 ms time limit from the determination of a communication fault condition in step 340 before the communication interface will reset in step 346, which allows for 3 re-tries. In this embodiment, the first re-try after a communication fault condition is determined is performed without adjustment of the control parameters. In step 346, it is determined if this is the first re-try after determination of the communication fault condition and, if so, the method returns to step 330 to perform the first re-try without adjustment of the control parameters. If a communication fault condition is determined after this re-try, a control parameter of the transmitter converter 140 is adjusted. If the determination at step 346 is that this is not the first re-try, the method moves to step 350 to adjust a control parameter.

The adjusted control parameter is either inverter phase or DC-DC boost converter output voltage level. If the inverter phase is less than 180°, the phase will be increase towards 180°. If the phase is 180°, the boost converter output voltage will be increased. In this example, phase may be increased by 5° increments per step and boost converter output voltage may be increased by 0.1V increments per step. In step 352, the current phase of the inverter is determined. If the phase is less than 180°, the method moves to step 354 in which the inverter phase is increased. If the determination in step 352 is that the inverter phase is already at 180°, the method moves to step 356 in which the output voltage of the boost converter is increased. After each of steps 354 and 356, the method returns to step 330 to perform a re-try at the adjusted control parameters.

If, in step 348, the timer reaches the time limit, which is 300 ms in this example, before it is determined in step 340 that the communication fault condition no longer exists, the communication interface will be reset.

In each of steps 342 and 348, the timer will be reset (if necessary) in order to allow the time limit to start again from 0 upon further determination of a communication fault condition.

An illustrative example of a change from an unsuitable operating state to a suitable operating state is shown in FIG. X in accordance with one embodiment. The x axis of this plot corresponds to different use cases (need more), the y axis The foregoing is merely illustrative and various modifications can be made to the described embodiments. The foregoing embodiments may be implemented individually or in any combination, and elements from one embodiment may be combined with others.

What is claimed is:

1. An inductive power transmitter comprising:
a power transmitting coil configured to produce an inductive power transfer field;
communication circuitry configured to communicate with an inductive power receiver using modulation of the inductive power transfer field;
monitoring circuitry operatively connected to the communication circuitry and configured to determine a communication fault condition that includes one or more of a corrupt, unreadable, incomplete, invalid, or missing communication; and
a converter configured to provide an alternating current voltage to the power transmitting coil and adjust a control parameter upon a determination of a communication fault condition, wherein the converter is configured to adjust an additional control parameter if the communication fault condition is not removed after adjustment of the control parameter.

2. An inductive power transmitter according to claim 1, wherein the converter is configured to progressively adjust the control parameter upon determination of the communication fault condition until the communication fault condition is removed.

3. An inductive power transmitter according to claim 2, wherein after the communication fault condition is removed the control parameter is kept at the last adjusted state or returned to the pre adjustment state.

4. An inductive power transmitter according to claim 1, wherein the control parameter is a characteristic of the alternating current voltage provided to the power transmitting coil.

5. An inductive power transmitter according to claim 4, wherein the control parameter is amplitude, duty cycle, phase delay or frequency of the alternating current voltage provided to the power transmitting coil.

6. An inductive power transmitter according to claim 5, wherein the converter is configured to progressively increase the amplitude, duty cycle, phase delay or frequency of the alternating current voltage provided to the power transmitting coil.

7. An inductive power transmitter according to claim 1, wherein the communication circuitry is configured to receive amplitude shift keying signals from the inductive power receiver.

8. An inductive power transmitter according to claim 7, wherein the communication circuitry is configured to transmit frequency shift keying or amplitude shift keying signals to the inductive power receiver.

9. An inductive power transmitter according to claim 1, wherein the converter includes a DC-DC converter and an inverter.

10. An inductive power transmitter according to claim 9, wherein the control parameter is a phase shift between switches of the inverter.

11. An inductive power transmitter according to claim 1, wherein:
the converter includes a DC-DC converter and an inverter;
the control parameter is a phase shift between switches of the inverter; and
the additional control parameter is output voltage level of the DC-DC converter.

12. An inductive power transmitter according to claim 11, wherein the converter is configured to increase the phase shift between switches of the inverter until an adjustment limit is reached and increase the output voltage level of the DC-DC converter if the adjustment limit of the switches is reached.

13. An inductive power receiver comprising:
a power receiving coil configured to couple to an inductive power transfer field;
communication circuitry configured to communicate with an inductive power transmitter using modulation of the inductive power transfer field;
monitoring circuitry operatively connected to the communication circuitry and configured to determine a communication fault condition that includes one or more of a corrupt, unreadable, incomplete, invalid, or missing communication; and
a converter configured to receive an alternating current voltage from the power receiving coil and adjust a control parameter upon a determination of a communication fault condition, wherein the converter is configured to adjust a second control parameter if the communication fault condition is not removed after adjustment of the control parameter.

14. An inductive power receiver according to claim 13, wherein the converter is configured to progressively adjust the control parameter upon determination of the communication fault condition until the communication fault condition is removed.

15. An inductive power receiver according to claim 13, wherein the control parameter is a characteristic of a voltage output by the converter.

16. An inductive power receiver according to claim 15, wherein the control parameter is amplitude of the voltage output by the converter.

17. An inductive power receiver according to claim 16, wherein the converter is configured to increase the amplitude of the voltage output by the converter upon determination of a communication fault condition.

18. An inductive power receiver according to claim 13, wherein the converter includes a regulator and/or a rectifier.

19. An inductive power receiver according to claim 13, wherein the communication circuitry is configured to receive frequency shift keying or amplitude shift keying signals from an inductive power transmitter.

20. An inductive power receiver according to claim 13, wherein the communication circuitry is configured to transmit amplitude shift keying signals to the transmitter.

21. A method comprising:
producing an inductive power transfer field using an inductive power transmitter;
coupling to the inductive power transfer field using an inductive power receiver;
modulating the inductive power transfer field to attempt to communicate between an inductive power transmitter and an inductive power receiver;
determining if a communication fault condition exists with the modulated field, wherein the communication fault condition includes one or more of a corrupt, unreadable, incomplete, invalid, or missing communication;
adjusting a control parameter of the transmitter or the inductive power receiver upon determination of the communication fault condition; and
adjusting a second control parameter if the communication fault condition is not removed after adjustment of the control parameter.

22. An inductive power transmitter comprising:
a power transmitting coil configured to produce an inductive power transfer field;
communication circuitry configured to communicate with an inductive power receiver using modulation of the inductive power transfer field, wherein the communication circuitry is configured to receive amplitude shift keying signals from the inductive power receiver;
monitoring circuitry operatively connected to the communication circuitry and configured to determine a communication fault condition that includes one or more of a corrupt, unreadable, incomplete, invalid, or missing communication; and
a converter configured to provide an alternating current voltage to the power transmitting coil and adjust a control parameter upon a determination of a communication fault condition.

23. An inductive power transmitter according to claim 22, wherein the converter is configured to progressively adjust the control parameter upon determination of the communication fault condition until the communication fault condition is removed.

24. An inductive power transmitter according to claim 23, wherein after the communication fault condition is removed the control parameter is kept at the last adjusted state or returned to the pre adjustment state.

25. An inductive power transmitter according to claim 22, wherein the control parameter is a characteristic of the alternating current voltage provided to the power transmitting coil.

26. An inductive power transmitter according to claim 25, wherein the control parameter is amplitude, duty cycle, phase delay or frequency of the alternating current voltage provided to the power transmitting coil.

27. An inductive power transmitter according to claim 26, wherein the converter is configured to progressively increase the amplitude, duty cycle, phase delay or frequency of the alternating current voltage provided to the power transmitting coil.

28. An inductive power transmitter according to claim 22, wherein the communication circuitry is configured to transmit frequency shift keying or amplitude shift keying signals to the inductive power receiver.

29. An inductive power transmitter according to claim 22, wherein the converter includes a DC-DC converter and an inverter.

30. An inductive power transmitter according to claim 29, wherein the control parameter is a phase shift between switches of the inverter.

31. An inductive power transmitter according to claim 22, wherein:
   the converter includes a DC-DC converter and an inverter;
   the control parameter is a phase shift between switches of the inverter; and
   the additional control parameter is output voltage level of the DC-DC converter.

32. An inductive power transmitter according to claim 31, wherein the converter is configured to increase the phase shift between switches of the inverter until an adjustment limit is reached and increase the output voltage level of the DC-DC converter if the adjustment limit of the switches is reached.

33. An inductive power receiver comprising:
   a power receiving coil configured to couple to an inductive power transfer field;
   communication circuitry configured to communicate with an inductive power transmitter using modulation of the inductive power transfer field including at least one of:
      transmitting amplitude shift keying signals to the inductive power transmitter,
      receiving frequency shift keying signals from the inductive power transmitter, and
      receiving amplitude shift keying signals from the inductive power transmitter;
   monitoring circuitry operatively connected to the communication circuitry and configured to determine a communication fault condition that includes one or more of a corrupt, unreadable, incomplete, invalid, or missing communication; and
   a converter configured to receive an alternating current voltage from the power receiving coil and adjust a control parameter upon a determination of a communication fault condition.

34. An inductive power receiver according to claim 33, wherein the converter is configured to progressively adjust the control parameter upon determination of the communication fault condition until the communication fault condition is removed.

35. An inductive power receiver according to claim 33, wherein the control parameter is a characteristic of a voltage output by the converter.

36. An inductive power receiver according to claim 35, wherein the control parameter is amplitude of the voltage output by the converter.

37. An inductive power receiver according to claim 36, wherein the converter is configured to increase the amplitude of the voltage output by the converter upon determination of a communication fault condition.

38. An inductive power receiver according to claim 33, wherein the converter includes a regulator or a rectifier.

* * * * *

UNITED STATES PATENT AND TRADEMARK OFFICE
CERTIFICATE OF CORRECTION

PATENT NO. : 11,070,088 B2
APPLICATION NO. : 16/213915
DATED : July 20, 2021
INVENTOR(S) : Rex Pius Huang et al.

It is certified that error appears in the above-identified patent and that said Letters Patent is hereby corrected as shown below:

In the Claims

Claim 18, at Column 14, Line 9:
Delete "and/"

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*